United States Patent
Breitfuss

(10) Patent No.: US 7,929,456 B2
(45) Date of Patent: Apr. 19, 2011

(54) CIRCUIT FOR A COMMUNICATION DEVICE AND METHOD OF CONTROLLING A TRANSMISSION

(75) Inventor: Klemens Breitfuss, Voitsberg (AT)

(73) Assignee: NXP B.V., Eindhoven (NL)

( * ) Notice: Subject to any disclaimer, the term of this patent is extended or adjusted under 35 U.S.C. 154(b) by 765 days.

(21) Appl. No.: 11/913,017

(22) PCT Filed: Apr. 25, 2006

(86) PCT No.: PCT/IB2006/051291
§ 371 (c)(1),
(2), (4) Date: Oct. 29, 2007

(87) PCT Pub. No.: WO2006/114768
PCT Pub. Date: Nov. 2, 2006

(65) Prior Publication Data
US 2008/0198907 A1    Aug. 21, 2008

(30) Foreign Application Priority Data

Apr. 28, 2005  (EP) .................................. 05103531

(51) Int. Cl.
*G06F 11/00* (2006.01)
(52) U.S. Cl. ........................ 370/252; 370/235
(58) Field of Classification Search .................. 370/252, 370/219, 241, 242, 244, 235
See application file for complete search history.

(56) References Cited

U.S. PATENT DOCUMENTS

| | | | |
|---|---|---|---|
| 4,580,262 A | 4/1986 | Naylor et al. | |
| 4,943,942 A * | 7/1990 | Dunnion | 375/222 |
| 5,345,231 A | 9/1994 | Koo et al. | |
| 5,553,064 A * | 9/1996 | Paff et al. | 370/478 |
| 5,664,157 A * | 9/1997 | Takahira et al. | 703/23 |
| 5,724,030 A | 3/1998 | Urbas et al. | |
| 5,982,764 A | 11/1999 | Palermo et al. | |
| 6,275,143 B1 | 8/2001 | Stobbe | |
| 7,600,173 B2 * | 10/2009 | Matsumoto | 714/755 |
| 2002/0044610 A1 * | 4/2002 | Jones | 375/261 |
| 2005/0077356 A1 | 4/2005 | Takayama et al. | |

FOREIGN PATENT DOCUMENTS

WO         2005015766 A1    2/2005

* cited by examiner

*Primary Examiner* — Brian D Nguyen

(57) ABSTRACT

A circuit (3) for a communication device (1), which communication device (1) comprises a transmission coil (2) that is provided for communicating with a further device (1'), comprises a transmitter (4), which transmitter (4) is designed to receive transmission data (TD) and to cooperate with the transmission coil (2) and to release to the transmission coil (2) a transmission data signal (TDS) that represents the transmission data (TD), and further comprises a receiver (5), which receiver is designed to cooperate with the transmission coil (2) and to receive from the transmission coil (2) a reception data signal (RDS) and to provide reception data (RD) that represent the reception data signal (RDS), and further comprises a control stage (7), which control stage (7) is designed to control the transmitter (4) for releasing the transmission data signal (TDS) simultaneous to the receiving of the reception data signal (RDS) by means of the receiver (5).

5 Claims, 2 Drawing Sheets

CIRCUIT FOR A COMMUNICATION DEVICE AND METHOD OF CONTROLLING A TRANSMISSION

FIELD OF THE INVENTION

The invention relates to a circuit for a communication device.

The invention further relates to a communication device comprising a circuit according to the preceding paragraph.

The invention further relates to a method of controlling a transmission of a transmission data signal.

BACKGROUND OF THE INVENTION

A communication device according to the second paragraph, comprising a circuit according to the first paragraph, which communication device is enabled to perform the method of controlling a transmission of a transmission data signal according to the third paragraph is known in connection with the international standard ISO/IEC 18092. The known communication device comprises a communication coil that forms transmission means. The communication coil is connected to the circuit. The communication coil is designed to establish an inductive coupling with a corresponding communication coil of a further device during a contact-less communication. The known communication device is designed to transmit according to said standard a transmission data signal to said further device. The further device can be a communication device of identical design or a so-called data carrier that is compliant with the international standard ISO/IEC 14443 or ISO/IEC 15693. The known communication device is also designed to receive according to said standard a reception data signal from said further device. Validity of said transmission data signal and said reception data signal is guaranteed by means of a so called anti-collision protocol. The anti collision protocol provides after its execution on all devices involved in the communication that only one single further device is selected for a contact-less communication with the communication device.

The known communication device shows the problem that the exchange of the transmission data signal and the reception data signal between selected devices can be observed relatively easy by means of e.g. bringing a so-called "spy" device into proximity to one of the devices involved in the contact-less communication and observing or analyzing the sequence or content of the transmission data signal and/or the reception data signal. This fact would basically allow performing a so-called "man in the middle" attack, which attack allows overtaking the role of one of the two legally involved devices for the purpose of e.g. fraudulent activities. In this context in contrast to the legally involved devices the spy device performing the man in the middle attack is a "non-legally" involved device.

OBJECT AND SUMMARY OF THE INVENTION

It is an object of the invention to provide a circuit of the type mentioned in the first paragraph and a communication device of the type mentioned in the second paragraph and a method of the type mentioned in the third paragraph, which obviate the drawbacks described above.

To achieve the object described above, characteristic features according to the invention are provided with a circuit according to the invention, so that a circuit according to the invention can be characterized as follows:

Circuit for a communication device, which communication device comprises transmission means that are provided for communicating with a further device, which circuit comprises a transmitter, which transmitter is designed to receive transmission data and to cooperate with the transmission means and to release to the transmission means a transmission data signal that represents the transmission data, and a receiver, which receiver is designed to cooperate with the transmission means and to receive from the transmission means a reception data signal and to provide reception data that represent the reception data signal, and control means, which control means are designed to control the transmitter for releasing the transmission data signal simultaneous to the receiving of the reception data signal by means of the receiver.

To achieve the object described above, characteristic features according to the invention are provided with a communication device according to the invention, so that a communication device according to the invention comprises a circuit according to the invention.

To achieve the object described above, characteristic features according to the invention are provided with a method according to the invention, so that a method according to the invention can be characterized as follows:

Method of controlling a transmission of a transmission data signal, which method comprises the following steps, namely receiving of a reception data signal from a further device and providing reception data representing the reception data signal, and transmitting simultaneously to the receiving of the reception data signals a transmission data signal representing transmission data.

The provision of the characteristic features according to the invention creates the advantage that against all past existing conventions and measures that were created in order to guarantee that only one selected device transmits a transmission data signal at a moment the communication device is first time ever enabled to perform a simultaneous bidirectional communication with a further device, in which bidirectional communication a transmission data signal is transmitted while at the same time a reception data signal is received. This type of bidirectional simultaneous communication provides the further advantage that for a third device, e.g. a spy device, analyzing the transmission data signal transmitted by the communication device to the further device or the reception data signal received from the further device will become relatively cumbersome or even impossible. The result of such analyses will be relatively inaccurate as the data signals caught by the spy device will not only comprise clearly distinguishable data signal units but also superposition of data signal units that are supposed to represent so called collisions according to prior art conventions and therefore have to be rejected according to the prior art conventions.

Some solutions according to the invention provide the advantage that the signal parameter of the modulated carrier signal can be varied according to a random scheme or according to a predefined scheme, which will make it even more difficult for a spy device to distinguish from which of the legally involved device the a data signal unit was transmitted that show a collision.

Other solutions according to the invention provide the advantage that a difference of signal parameters of data signal units originating form the transmission data signal on the one hand and from the reception data signal on the other hand can be computed and dependent on the difference the parameters of the transmission data signal can be adapted in order to provide a minimized difference between the signal parameters of the transmission data signal and the reception data signal or even equal signal parameters for the transmission data signal and the reception data signal. This solution will make any attempt by a spy device of distinguishing the legally involved device from which individual data signal units were released even harder and more complicated or even impossible.

Still other solutions of the invention provide the advantage that at least one random number or at least one unique identification number or the like can be exchanged between the communication device and the further device without having the fear that such number can entirely be spyed out or that it is very hard or even impossible to spy out from which legally involved device the number was transmitted. Such a number can e.g. be the basis for applying cryptography in a communication between the communication device and its legally involved communication partner that is the further device with which a communication is seriously desired and not the spy device which shall be excluded from participating in the communication. On the other hand the communication device transmitting the transmission data signal while receiving the reception data signal that of course also reflects said collisions of data signal units will have no problems in associating the appropriate value with one such data signal unit as the communication device knows for each such data signal unit which data signal unit was transmitted by itself that caused the collision for said data signal unit.

DESCRIPTION OF EMBODIMENTS

Figure 1:
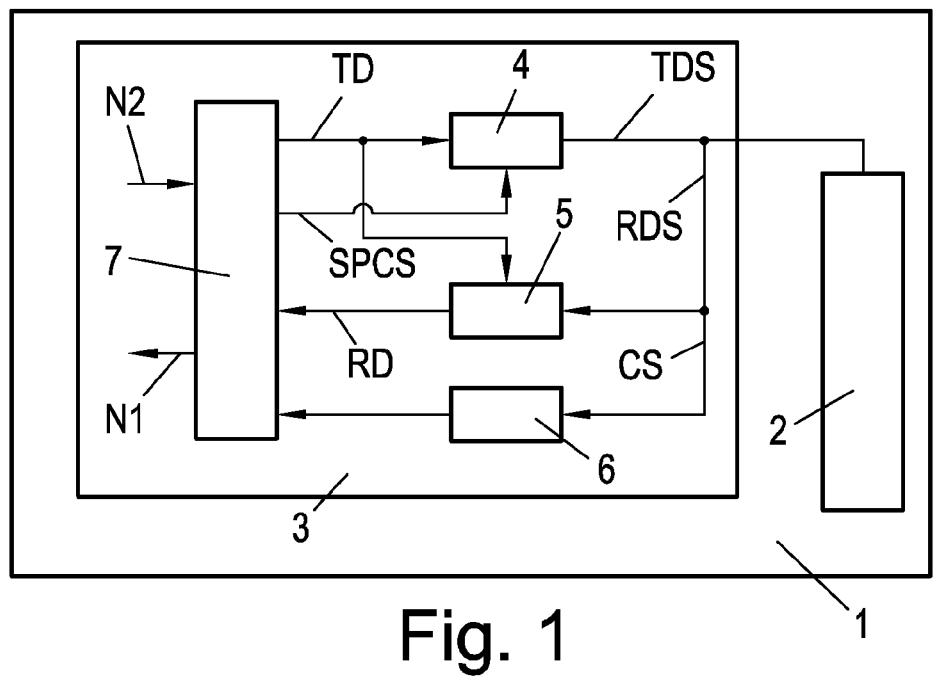
FIG. 1 shows in form of a block diagram a communication device according to a first embodiment of the invention.

FIG. 1 shows a communication device that realizes a so-called Near Field Communication (NFC) device 1. The NFC device 1 is designed to communicate according to the international standard ISO/IEC 18092 (NFC). The communication device 1 comprises transmission means 2 that are designed and provided for communicating with a further NFC device that is not shown in FIG. 1. The transmission means 2 are realized by a communication coil which in addition is connected to a matching network and a parallel capacitor, which matching network and capacitor are not shown as they are known in prior art. The communication coil provides for inductive coupling with a corresponding coil of the further NFC device. In this connection it can be mentioned that in another embodiment also a capacitive coupling can be realized for the purpose of contact-less communication. However also antennas may be comprised in the station transmission means 2, e.g. mono-pole or multi-pole antennas can be considered.

The NFC device 1 further comprises an integrated circuit 3 that is connected to the transmission means 2. The circuit 3 comprises a transmitter 4, a receiver 5, signal parameter determining means 6 and control means 7. The control means 7 are coupled with the transmitter 4 and the receiver 5 and the signal parameter determining means 6.

The control means 7 are designed to release transmission data TD to the transmitter 4 and to receive reception data RD from the receiver 5. A data unit of the transmission data TD is a bit and represents a first number that is either a logical ONE (or "1") or a logical ZERO ("0"). A data unit of the reception data RD is also a bit and represents a second number that is either a logical ONE or a logical ZERO.

Figure 2:
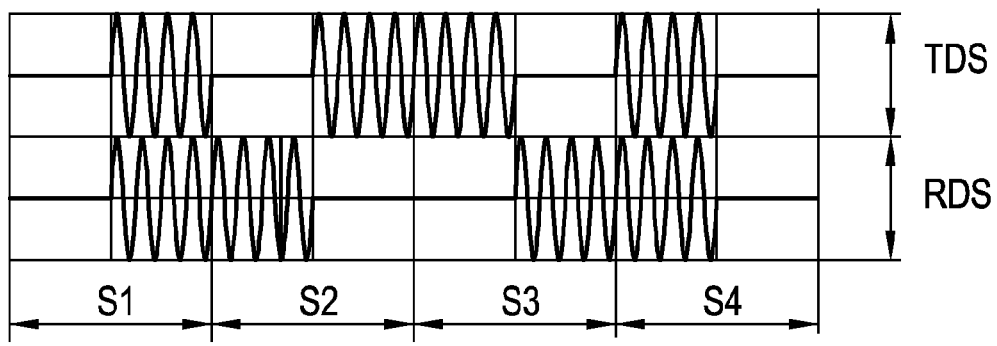
FIG. 2 shows in form of a signal chart a sub carrier representation of a transmission data signal and a reception data signal used by the device according to FIG. 1.

The transmitter 4 is designed to receive the transmission data TD and to cooperate with the transmission means 2 and to release to the transmission means 2 a transmission data signal TDS that represents the transmission data TD. In order to produce and to release the transmission data signal TDS the transmitter 4 is designed to produce a carrier signal and to derive from the carrier signal a sub-carrier signal. In order to produce a modulated carrier signal the transmitter is designed to code the sub-carrier signal representing said data unit according to the Manchester coding scheme that is shown in FIG. 2. The signal chart shown in FIG. 2 comprises four signal parts S1, S2, S3 and S4 of the coded sub-carrier signal that represents the transmission data signal TDS representing four bits having the binary values "0011" and the reception data signal RDS in its non-disturbed form representing four bits having the binary values "0101". The representation of the reception data signal RDS shows the sub carrier coding of a bit representing a logic ZERO during the first signal part S1 and during the third signal part S3 and the signal parts S2 and S4 show the sub-carrier coding of a bit representing a logic ONE. The representation of the transmission data signal TDS shows the sub carrier coding of a bit representing a logic ZERO during the first signal part S1 and during the second signal part S2 and the signal parts S3 and S4 show the sub-carrier coding of a bit representing a logic ONE. The transmitter 4 shown in FIG. 2 is further designed for applying the coded sub-carrier signal to the carrier signal in order to produce an amplitude modulation of the carrier signal dependent on the transmission data. For the sake of simplicity the coded sub-carriers for the reception data signal RDS and the transmission data signal TDS show in FIG. 2 have identical amplitude levels. In a realistic prior art communication this would typically not be the case.

Advantageously the transmitter 4 is further designed to receive a signal parameter control signal SPCS and to produce a modulated carrier signal dependent on the transmission data TD and in addition also dependent on the signal parameter control signal SPCS. In the present case the signal parameter to be controlled is the signal level of the transmission data signal TDS, which is determined by the signal level of the sub-carrier signal. Consequently the transmitter 4 is designed to change the signal amplitude of the sub-carrier signal that causes the transmission data signal TSD. This provides that in the power spectrum of the transmission data signal TDS a carrier signal peak of the carrier signal exists at a frequency of e.g. 13.56 MHz and two further peaks, namely sub-carrier signal peaks exist at a position of e.g. (13.56 MHz+848 kHz) and (13.56 MHz−848 kHz) according to a sub-carrier frequency of 848 kHz, wherein the size (height) of the sub-carrier peaks is variable dependent on the signal parameter control signal SPCS. In this connection it can be mentioned that the signal parameter control signal SPCS can also be utilized to control in addition to the signal level also the phase and/or the frequency of the carrier signal, if this is required. However for the present case it is assumed that phase and frequency do not require to be controlled. The means for varying or changing the amplitude, the frequency or the phase of a signal are known to those skilled in the art and therefore not elaborated in details.

The receiver 5 is designed to cooperate with the transmission means 2 and to receive from the transmission means 2 the reception data signal RDS and to provide reception data RD that represent the reception data signal RDS.

Advantageously the control means are further designed to control the transmitter 4 for releasing the transmission data signal TDS simultaneous to the reception of the reception data signal by means of the receiver 5. In the present embodiment a simultaneous bidirectional communication with the further device is started by communicating a command to the further device, e.g. a request command for requesting the further device to communicate a serial number back to the NFC device. Due to the fact that the response behavior of the further device is defined by the international standard mentioned above the control means 7 release transmission data TD following the request command according to the timing applicable for receiving the response data signal RDS as defined in said international standard. However it could also be implemented to have a transmission data buffer for buffering the transmission data TD and to provide by the control means 7 a transmission trigger signal to the transmitter 4 that triggers the transmitter 4 to fetch transmission data TD from the transmission data buffer and to release the corresponding transmission data signal TDS clocked by the transmission trigger signal synchronous to the receiving of the reception data signal RDS.

Figure 3:
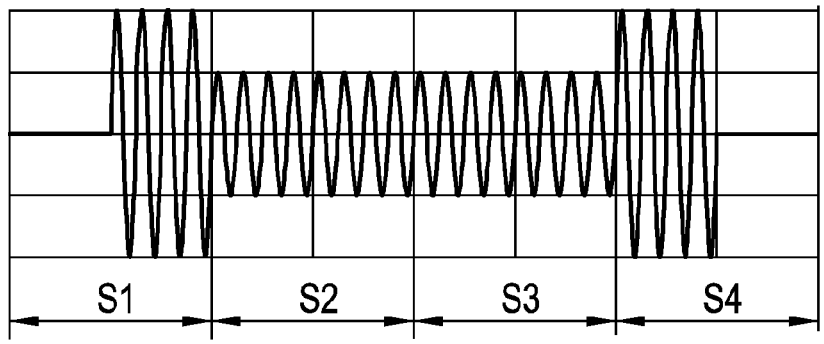
FIG. 3 shows in the same manner as FIG. 1 a superposition of the transmission data signal and the reception data signal according to FIG. 2.

In the present embodiment the reception data signal RDS represents a load modulation of the carrier signal, which load modulation of the carrier signal is performed by the further device during a contact-less communication with the NFC device 1. The reception data signal RDS is taped at a circuit point of the circuit 3 to which also the transmitter 4 and the transmission means 2 is connected. According to the above mentioned international standard the receiver 5 is designed to detect a collision signal CS represented by the reception data signal RDS, which collision signal CS indicates that the reception data signal RDS represents two different numbers, which in the present case is a logic ZERO and a logic ONE, wherein the first number (e.g. a bit) of the two numbers is represented by the released transmission data signal TDS and the second number (e.g. a bit) of the two numbers originates from the further device. Such a bit oriented detection of the collision signal CS is basically known form prior art radio frequency identification (RFID) devices being compliant with the international standard e.g. ISO/IEC 14443 (anti-collision scheme) but utilized only in connection with selecting one particular radio frequency device out of a group of radio identification devices, also called tag, label or the like. FIG. 3 shows a superposition of the signal parts S1 to S4 of FIG. 2. Accordingly the first signal part S1 and the fourth signal part S4 allows to identify a bit having the logical value ZERO and the second signal part S2 and the third signal part S3 show the collision signal CS, for which two signal parts S2 and S3 it is not possible to define the logical value ZERO or ONE that is represented by these signal parts without any further knowledge or assumption. It is to mention that the amplitude (signal level) of the first half of the second signal part S2 and the second half of the second signal part S2 may be different without any precautions like applying an appropriate signal parameter control signal SPCS to the transmitter 4, which will be elaborated throughout the following text.

Advantageously the receiver 5 shown in FIG. 3 is designed to receive the transmission data TD and to derive based on the known first number represented by the transmission data TD (e.g. logical ZERO during the second signal part S2 shown in FIG. 2) the second number originating from the further device (e.g. logical ONE during the second signal part S2 shown in FIG. 2) and to release the reception data RD representing the derived second number to the control means 7. Hence the detected collision signal CS does not provoke an abortion of any further reception or transmission of data signals as known in prior art. Rather said detection is used to trigger a determination of the reception data RD dependent on the transmission data TD.

The signal parameter determining means 6 are also connected to the circuit point to which the transmitter 4 and the receiver 5 and the transmission means 2 are connected. This allows basically taping the respective single signal, which is the transmission data signal TDS independent from the reception data signal RDS or the reception data signal RDS independent from the transmission data signal TDS, or a signal combination (superposition) of the transmission data signal TDS and the reception data signal RDS. The signal parameter determination means 6 are designed to receive the transmission data signal TDS and to determine at least one transmission signal parameter of the transmission data signal TDS. In the present embodiment the transmission signal parameter is defined as the signal level of said transmission data signal TDS. In addition also frequency and/or phase of said transmission data signal TDS may be determined in further embodiment. The signal parameter determination means 6 are designed to generate and to release a first parameter representation signal R1 that represents the signal level of the transmission data signal TDS. The signal parameter determination means 6 are designed to receive the reception data signal RDS and to determine at least one reception signal parameter of the reception data signal RDS. In the present embodiment the reception signal parameter is defined as the signal level of said reception data signal RDS. In addition also frequency and/or phase of said reception data signal RDS may be determined in a further embodiment. The signal parameter determination means 6 are designed to generate and to release a second parameter representation signal R2 that represents the signal level of the reception data signal RDS. It is to mention that in a further embodiment the first representation signal R1 and the second representation signal R2 may comprise also the representation of the phase or the frequency of the respective data signals TDS or RDS.

The control means 7 are further designed to receive the first parameter representation signal R1 and the second parameter representation signal R2 form the signal parameter determination means 6 and to determine the difference of the signal parameter represented by the two parameter representation signal R1 and R2. As mention in the preceding paragraph not only the difference of the signal level of the transmission data signal TDS and the signal level of the reception data signal RDS but also the difference of the frequencies and/or the phases of the two data signals TDS and RDS may be considered in a further embodiment. The control means 7 are further designed to release dependent on said parameter representation signal R1 and R2, which means on the determined difference of the signal levels, the signal parameter control signal SPCS to the transmitter 4 in order to minimize the determined difference of the signal levels. According to another embodiment the signal parameter control signal SPCS may also be utilized to reduce any other determined parameter difference.

These measures provide the advantage that the signal levels of the transmission data signal TDS and the reception data signal RDS or more precisely the side band power spectrum peaks of the transmission data signal TDS and the reception data signal RDS are leveled. Consequently it will become difficult or even impossible for a third party, e.g. a spy device, to determine which device has released which part of the superposition of the transmission data signal TDS and the reception data signal RDS and to derive the logical data signal content for each signal part.

Although throughout the text of the preceding description always a bit was mentioned to represent a data unit and the signals described reflect this limitation it can be mentioned that the scope of this invention is not limited to such embodiments as also signals are known that represent more than one bit, e.g. like used in quadrature amplitude modulation (QAM). In case of QAM three or more numbers are represented by a single signal part and the collision signal CS can be handled within the scope of this invention by having knowledge of one of two numbers that have caused the collision signal.

Although the integrated circuit 3 is described as integrated circuit it can be mentioned that also discrete circuits may be considered.

Throughout the preceding description the communication device and the further device are described as NFC devices having identical embodiment. However also one communication device 1 may be sufficient to realize the invention as the other device could be a radio frequency identification (RFID) device being designed to response to a request command of the requesting NFC device without having any further measures according to the invention implemented and therefore simply ignoring the transmission data signal TDS communicated simultaneous to the releasing of its e.g. unique serial number. In addition it can be mentioned to implement the measures according to the invention in e.g. a so-called reader station of a ISO/IEC 14443 compliant RFID system.

In the following the operation of the communication device is described. Therefore it is considered that the NFC device 1 is embedded in a personal computer (PC) (not shown in figures) on which PC security sensitive data are stored. The further device is of the same type and structure as the NFC device 1 and is embedded in a mobile phone (not shown in figures). By means of the NFC device 1 and the further device a secure contact-less communication shall be established that allows exchanging the security sensitive data. In order to establish a secure contact-less communication the two devices are arranged into close proximity to each other. According to the NFC standard one of the two NFC devices 1, let us assume the one that is embedded in the PC, takes the initiative and performs as a master NFC device 1 while the further device that is embedded in the mobile phone performs as a slave NFC device 1' (not shown in figure). According to this definition of roles the master NFC device 1 initiates the communication by means of releasing a secure communication request command for requesting the slave NFC device 1' to communicate its unique serial number back to the master NFC device 1 where it is utilized for ciphering the data to be exchanged.

The communication request command is released according to prior art definitions given in the international standard ISO/IEC 18092, which means that an amplitude modulation of the carrier signal is performed by applying a 100% modulation scheme. Following the transmission of the communication request command the (master) NFC device 1 must make sure that only one further communication device 1' is involved in the following communication. In order to achieve this goal a prior art anti-collision procedure is performed in order to guarantee that only the two NFC devices 1 and 1' are involved in the communication. However in the present embodiment it is implemented that an problem indication signal is produced that indicates that a collision was detected during the anti-collision procedure and a user operating the devices will be alerted to change the location or position of other devices that may cause the collision. Details regarding how the problem indication signal is made available are not any further elaborated as this does not concern the gist of the invention.

One drawback of the anti-collision procedure is that it can only exclude devices from playing an active role in the meaning of releasing data signals but it can not exclude other devices from listening to the communication between the two NFC devices 1 and 1' that were selected during the anti-collision procedure for the purpose of communicating thereafter. In order to secure the contact-less communication between the two "legally" selected NFC devices 1 and 1' by means of exchanging the unique identification numbers in a way that can not be spied out by a third party device, let it be called spy device, a method of controlling a transmission of the transmission data signals TDS is applied by the NFC device 1 that is embedded in the PC, which method deviates from the protocols defined by the internationals standard ISO/IEC 18092.

As a general rule of this method the method comprises the steps of receiving of the reception data signals RDS from the (further) slave NFC device 1' and providing reception data RD representing the reception data signal RDS by means of the receiver 5, while simultaneous to the receiving of the reception data signal RDS the transmission data signal TDS that represents transmission data TD is transmitted by means of the transmission means 4. The modulation scheme applied during the method is distinctly different from the 100% modulation scheme that is typically applied for a communication from a master NFC device 1 to a slave NFC device 1'. During this method the modulation scheme applied is the modulation scheme defined in said standard for a passive communication device, which means load modulation of a provided carrier signal with less than 100% modulation depth.

Figure 4:
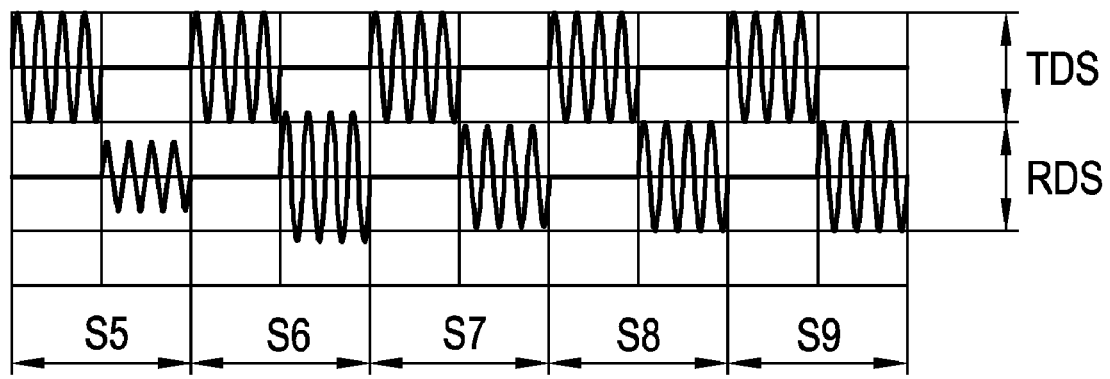
FIG. 4 shows in the same manner as FIG. 2 a reception signal having a fixed signal level and a transmission signal having a variable signal level.

In order to make the origin of the data signals TDS and RDS invisible for the spy device the method allows to adjust the power spectrum of the side bands of the transmitted transmission data signal TDS to the power spectrum of the side bands of the reception data signal RDS. Therefore the slave NFC device 1' transmits reception data signals RDS that represent a logical ONE while synchronous to the receiving of the reception data signal RDS the master NFC device 1 transmits transmission data signals TDS that represent a logical ZERO as shown in FIG. 4. This synchronous exchange of logical ZEROs and ONEs is repeated for a number of five (5) times as shown in FIG. 4 by means of the signal parts S5 to S9. However the number of repetition may vary dependent on the result to be achieved that is the identity of the two power spectrums as mentioned hereinbefore.

Figure 5:
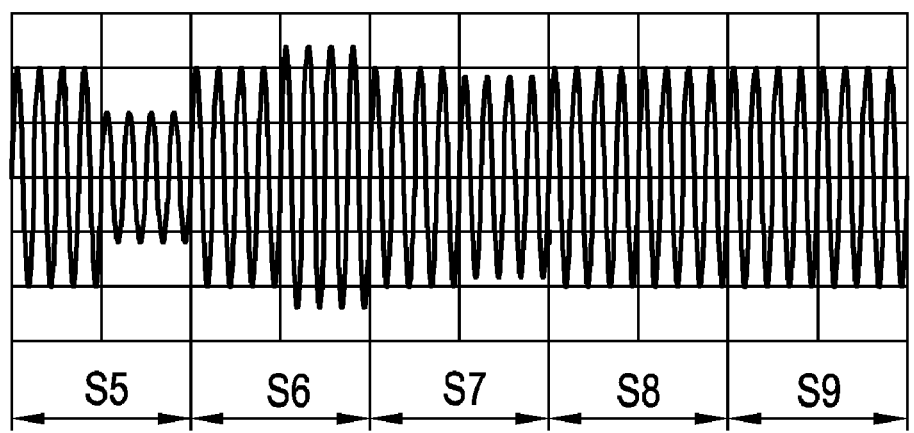
FIG. 5 shows in the same manner as FIG. 2 a superposition of the transmission signal and the reception signal according to FIG. 4.

In order to achieve this result the method comprises the step of producing by means of the transmitter 4 a modulated carrier signal by means of modulating the carrier signal dependent on the transmission data TD (logic ZERO) and dependent on the signal parameter control signal SPCS, such that the signal level of the modulated carrier signal is determined by the signal parameter control signal SPCS, and releasing the modulated carrier signal as the transmission data signal TDS. According to FIG. 4, signal part S5, the signal parameter control signal SPCS representing a preset initial signal level is applied to the transmission means 4. Consequently the signal level of the sub-carrier of the reception data signal RDS and the transmission data signal TDS are quite different. The superposition of these data signals RDS and TDS is shown in FIG. 5, signal part S5. During the signal part S5 the power spectrum of the side bands for the first half of the signal part S5 will be distinctly different form the power spectrum of the side bands for the second half of the signal part S5.

In order to have the two power spectrums matched with each other the method comprises for each first half of the signal parts S5 to S9 shown in FIG. 5 determining by means of the signal parameter determining means 6 the signal level of the transmission data signal TDS and releasing the first parameter representation signal R1 that represents the transmission signal level. The method further comprises for each second half of the signal parts S5 to S9 shown in FIG. 5 determining by means of the signal parameter determining means 6 the reception signal level of the reception data signal RDS and releasing the second parameter representation signal R2 that represents the reception signal level. The method further comprises dependent on said representation signals R1 and R2 for the signal part (n) releasing said signal parameter control signal SPCS for the following signal part (n+1) such that the difference between the determined reception signal level of the signal part (n+1) and the corresponding transmission signal level, which is the signal level of the signal part (n+1) is reduced. In the present embodiment the difference between the reception signal level and the transmission signal level is reduced iteratively as shown in FIG. 5. However also an analytical approach may be considered that could lead to a faster or immediate reduction of the difference.

According to the following description it was assumed that the distance between the master NFC device 1 and the slave NFC device 1' does not change as they are located in a stable position close to each other. Consequently a further adjusting of the transmission signal level to reception signal level is not required. Having not such a stable arrangement may lead to the requirement that after having established a first signal level match the signals levels require to be dynamically monitored and the signal level of the sub carrier causing the transmission data signal TDS must be dynamically adjusted also during the exchange of data signals following the initial signal level match. The dynamic adjustment may be performed based on determining signal levels during the signal parts that represent the collision signal CS.

After having adjusted the power spectrum of the reception data signal RDS and the transmission data signal TDS to each other the unique identification number of the master NFC device 1 is transmitted in a bit by bit manner to the slave NFC device 1 simultaneous to a bit by bit reception of the unique identification number of the slave NFC device 1. The unique identification number of the master NFC device 1 is represented by the transmission data TD. In case that corresponding bits of the unique identification number of the master NFC device 1 and the slave NFC device 1' represent identical logical values the superposition of the transmission data signal TDS produced by the transmitter 4 and the reception data signal RDS received by the receiver 5 is shown in FIG. 3, signal part S1, in the case that the represented logical value is ZERO and shown in FIG. 3, signal part S4, in the case that the represented logical value is ONE. For both cases not only the master NFC devices 1 and the slave NFC device 1' can unmistakably determine the logical value but also the spy device can determine that the master NFC device 1 and the slave NFC device 1' have both communicated identical logical values. This is not the case for situations in which the corresponding bits of the unique identification number of the master NFC device 1 and the slave NFC device 1 represent different logical values. In this situation the superposition of the transmission data signal TDS and the reception data signal RDS received by the receiver 5 is shown in FIG. 3, signal part S2 and signal part S3. In the case that the transmission signal level and the reception signal level were matched appropriately it will be relatively cumbersome or even impossible for a spy device to determine which device has sent which logical value.

In order to provide valid reception data RD the method comprises detecting a collision signal CS represented by the reception data signal RDS for situations shown in corresponding signal parts S2 and S3 of FIG. 2 and FIG. 3. The method further comprises deriving a value of a bit of the number originating from the slave NFC device 1' based on the known value of the corresponding (synchronous) bit of the number originating from the master NFC device 1. In the present case the first binary value represented by the transmission data signal TDS is the binary complement of a second binary value represented by the reception data signal RDS without the superposition with the binary value represented by the transmission data signal TDS. Consequently the reception data RD will represent the binary complement of the binary value of the transmission data TD that has caused the collision signal.

As an example it may be considered that the unique identification number of the master NFC device 1 shall be "c5" in hexadecimal coding, which is "1100 0101" in binary coding. The unique identification number of the slave NFC device 1' shall be "73" in hexadecimal coding, which is "0111 0011" in binary coding. According to the above given description the two legally involved NFC devices 1 will exchange the unique identification numbers and resolve (decode) the collision signals CS occurring during the communication for the bit positions 0, 2, 3, 5 and 6 according to the method explained hereinabove. On the other hand the spy device will understand only the number "x1xx 0xx1" in binary coding, wherein the symbol "x" indicates a collision signal for which the spy device can not distinguish which device has sent a logical ZERO or a logical ONE. According to this example the spy device may detect approximately 50% of the unique identification numbers but the numbers are independent from each other, which may be of advantage for cryptographic purposes.

As a further example it may be considered that both legally involved NFC devices 1 delete the bits having identical logical values. In order to receive a unique number having a pre defined length it will be necessary to send more bits as required for establishing the unique number. Regarding the numbers defined in the preceding paragraph the new unique number is "0*11 *01*", wherein the symbol "*" indicated bit positions that have been deleted. A draw back of this method might be that both legally involved NFC devices 1 and 1' know only one unique number, which is "01101". The advantage of this method is given in the fact that the spy device does not know this number because the bits that are obvious are deleted and the value of the bits that are not obvious for the spy device have been determined internally within the master NFC device 1 and the slave NFC device 1'.

As a further example it is considered that only one device, e.g. the master NFC device 1, which can receive and transmit at the same time according to the invention, is involved in a communication with a sort of standard RFID tag that is not designed perform a bi-direction synchronous communication according to the invention. Having provided the unique identification numbers as defined in the preceding paragraphs it can be concluded that the spy device will understand the number "x1xx 0xx1" while both devices know the entire number that was provided by the standard RFID tag, which number is "0111 0011". This sort of communication can be considered as unidirectional synchronous communication as the standard RFID tag will not listen to the transmission data signal TDS that is transmitted by the master NFC device 1 and that is simply used to hide form the spy device as many bits as possible that were received from the RFID tag.

Although the name "unique identification number" was used throughout the examples given above also random numbers or other type of numbers my be considered to be exchanged during the bidirectional or unidirectional synchronous contact-less communication.

Regarding the design of the circuit 3 it can be mentioned that the control means 7 can be partly associated with the transmitter 4 and with the receiver 5 or can even be incorporated within the transmitter 4 and the receiver 5 and can be designed to exchange data with each other.

Although the processing of numbers exchanged between devices 1 during a contact-less communication is not mentioned in details because it does not concern the invention it can be mentioned that a number N1 represented by the reception data RD or a number N2 represented by the transmission data TD can either be processed by the circuit 3 or can be exchanged with a higher level device in which the devices 1 is embedded or to which the device 1 is connected.

Throughout the description the focus was given on contact-less communication. However the concept of the invention is not limited to contact-less communication and can be applied to contact-bound communication devices as well.

It can be mentioned that after having established appropriate signal parameters by the aid of the signal parameter determining means 6 also during the process of receiving the reception data signal RDS and the synchronous transmitting of the transmission data signal TDS the signal parameter determining means 6 can be used to monitor the signal level or the respective signal parameter of interest and to provide the representation signals R1 and R2 also during said synchronous communication. In combination with the control means 7 it can be provided that the difference between the monitored signal parameters can be evaluated also during said synchronous communication and in case that the difference between the signal parameters exceeds a predefined allowed value a warning signal can be released or the communication may even be aborted because a "man in the middle" attack might have been detected.

It finally should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware (or software). The mere fact that certain measures are recited in mutually different dependent claims does not indicate that a combination of these measures cannot be used to advantage.

The invention claimed is:

1. A circuit for a communication device, the communication device comprising transmission means that are provided for communicating with a further device, wherein the circuit comprises:

a transmitter designed to receive transmission data, to cooperate with the transmission means, to release to the transmission means a transmission data signal that represents the transmission data, to produce a modulated carrier signal dependent on the transmission data, and to release the modulated carrier signal as the transmission data signal, a receiver designed to cooperate with the transmission means, to receive from the transmission means a reception data signal and to provide reception data that represent the reception data signal, and control means designed to control the transmitter for releasing the transmission data signal simultaneous to the receiving of the reception data signal by means of the receiver characterized by signal parameter determining means designed to receive the transmission data signal, to determine the signal level, the phase or frequency of the transmission data signal, to generate and release a first parameter representation signal that represents the signal level, the phase or frequency of the transmission data signal, to receive the reception data signal, to determine the signal level, the phase or frequency of the reception data, and to generate and to release a second parameter representation signal that represents the signal level, the phase or frequency of the reception data signal, wherein the control means are designed to receive the first parameter representation signal and the second parameter representation signal and to release, dependent on the parameter representation signals, a signal parameter control signal meant for the transmitter such that a difference between the determined signal levels, phases or frequencies of the reception and transmission data signals is reduced, and wherein the transmitter is designed to produce the modulated carrier signal also dependent on the signal parameter control signal.

2. The circuit according to claim 1, wherein the control means are designed to provide the transmission data that represent a first number and to receive the reception data that represent a second number originating from the further device, and the receiver is designed to detect a collision signal represented by the reception data signal, which collision signal indicates that the reception data signal represents two different numbers, wherein one number of the two numbers is the first number being represented by the released transmission data signal and the other number of the two numbers is the second number originating from the further device, and to receive the transmission data and to derive based on the first number represented by the transmission data the second number originating from the further device and to release the reception data representing the derived second number.

3. A communication device, comprising transmission means that are provided for a communication with a further device, and a circuit according to claim 1.

4. A method of controlling a transmission of a transmission data signal, comprising:

receiving of a reception data signal from a further device, providing reception data representing the reception data signal, and transmitting simultaneously to the receiving of the reception data signals, a transmission data signal representing transmission data, wherein the transmission data signal is produced comprising:

producing a modulated carrier signal as the transmission data signal by means of modulating a carrier signal dependent on the transmission data characterized by determining the signal level, the phase or frequency of the transmission data signal, releasing a first parameter representation signal representing the signal level, the phase or the frequency of the transmission data signal, determining the signal level, the phase or frequency of the reception data signal, releasing a second parameter representation signal representing the signal level, the phase or the frequency of the reception data signal, generating a signal parameter control signal dependent on the first and second representation signals, and producing the modulated carrier signal dependent on the signal parameter control signal such that a difference between the signal levels, the phases or the frequencies of the reception and transmission data signals is reduced.

5. The method according to claim 4, wherein a first number is represented by the transmission data, and a collision signal represented by the reception data signal is detected, which collision signal indicates that the reception data signal represents two different numbers, wherein one number of the two numbers is the first number being represented by the transmitted transmission data signal and the other number of the two numbers is a second number originating from the further device, and the second number originating from the further device is derived based on the first number represented by the transmission data and the derived second number is represented by the reception data.

* * * * *